Patented May 28, 1940

2,202,526

UNITED STATES PATENT OFFICE 2,202,526

PURIFICATION OF PHOSPHORIC ACID

Arthur W. Hixson, Leonia, N. J., and Ralph Miller, New York, N. Y., assignors to The Chemical Foundation, Incorporated, a corporation of Delaware No Drawing. Application May 26, 1938, Serial No. 210,272

3 Claims. (Cl. 23—165)

Our invention concerns an improvement in the process commonly employed in purifying phosphoric acid made by the action of sulphuric acid on phosphate rock. The most expensive part of this process is the removal of iron and aluminum from the acid solution. The usual method of removing iron and aluminum is described by Waggaman and Easterwood in their American Chemical Society monograph, "Phosphoric Acid, Phosphates and Phosphatic Fertilizers," on page 200. It consists in neutralizing the acid with finely ground limestone until the free acidity of the resulting solution is reduced to about 4.5 per cent. The precipitated impurities are next filtered off, and the solution is then made acid again with sulphuric acid. The calcium sulphate which has precipitated must then be filtered off.

It is obvious from the above description that such process is not only time-consuming, but also expensive in that valuable reagents are consumed. It is an object of our invention to accomplish the removal not only of iron and aluminum but also of lead in such a manner that no reagents shall be consumed.

We have found that if glacial acetic acid is added in slight excess to any impure phosphoric acid solution, all the principal metallic impurities such as iron, aluminum and lead will be precipitated. The precipitate may be separated from the solution by any suitable means. The purified solution may now be distilled. A large amount of the water and all the acetic acid will be vaporized.

The quantity of glacial acetic acid to be added must be empirically determined. A slight excess of glacial acetic acid is present when the addition of a small amount of glacial acetic acid causes no additional precipitate to form. The amount of glacial acetic acid that is necessary to provide a slight excess will be determined by the strength of the acid, the type and amount of impurities present, and the purity that is desired in the final product.

In order to recover the acetic acid, the vapors of water and acetic acid are led into a rectifying tower in which a water withdrawing agent such as isopropyl ether is present. Under proper control conditions an azeotropic distillation is carried out so that glacial acetic acid is withdrawn from the base of the tower and water is removed from the top of the tower. In this manner, the glacial acetic acid is wholly recovered in a form which permits its immediate return to the purification process.

This process was carried out upon a sample of commercial phosphoric acid which was relatively dilute for it contained but 20 percent. orthophosphoric acid. Upon analysis it was found to contain 1.3 percent. of metallic impurities. The rather low value of impurities present is accounted for by the fact that it was made from high grade Florida phosphate rock and that it was so dilute. Upon treatment with glacial acetic acid using about four volumes of glacial acetic acid to one of phosphoric acid, a voluminous precipitate formed. The precipitate was removed by filtration and the resulting solution analyzed. It contained less than .07 percent. impurities and no lead was present. The precipitate removed by filtration was found to contain seven percent: lead.

It is to be realized that if in the foregoing example a fifty percent. phosphoric acid were treated, it would be possible to achieve the same result by employing the same volume of glacial acetic acid dissolved in enough water so that the final concentrations of water, phosphoric acid and acetic acid, would be equal to that of the foregoing example. Thus, in any particular case, it will be possible to add the glacial acetic acid dissolved in water. As a rule, the phosphoric acid may be more readily and completely purified by the use of glacial acetic acid than by using concentrated solutions of acetic acid. This does not preclude the possibility of using concentrated acetic acid of sixty percent. or higher when a less pure product is satisfactory.

Similar results have been achieved with propionic acid and acetone.

This process is distinguished by the fact that it permits acids of any concentration to be readily purified, that the purification is achieved without the consumption of any reagents, and without adding or substituting any other impurities to the final product, a characteristic of other methods now employed. It can be used to remove large or small amounts of impurities and is especially helpful in removing those impurities most costly to remove by ordinary methods.

In some cases mixtures of acetone and glacial acetic acid and acetone and propionic acid have been found useful. They have been employed in an analogous fashion to that described for the use of glacial acetic acid.

In the following claims it is to be understood that the organic compounds may be dissolved in water before they are added to the phosphoric acid solution, but that such a procedure will produce a less pure phosphoric acid.

We claim:

1. A process of purifying dilute aqueous phosphoric acid solutions of about 20% concentration containing metallic impurities in dissolved form, which comprises, contacting a volume of dilute acid with several volumes of glacial acetic acid to thereby precipitate metallic impurities, separating the metallic impurities, and treating the resulting solution to recover purified phosphoric acid.

2. A process of purifying phosphoric acid solutions which comprises treating a volume of dilute phosphoric acid solution of about 20% concentration and containing metallic impurities in dissolved form with several volumes of glacial acetic acid to thereby precipitate the metallic impurities, separating the metallic impurities and subjecting the resulting solution to distillation to recover purified phosphoric acid.

3. A process of purifying phosphoric acid solutions which comprises treating a volume of dilute aqueous phosphoric acid solution of about 20% concentration and containing metallic impurities in dissolved form with several volumes of glacial acetic acid in excess over the amount of phosphoric acid solution treated to thereby precipitate the metallic impurities, separating such impurities from the solution, distilling the solution to recover a purified phosphoric acid solution and a dilute aqueous acetic acid; subjecting the dilute acetic acid to azeotropic distillation to recover glacial acetic acid and utilizing such recovered glacial acetic acid for further purification.

ARTHUR W. HIXSON.
RALPH MILLER.